April 27, 1965   SVEN-ERIC ISACSSON   3,180,472
BRAKING ROLLER FOR CONVEYOR
Filed March 5, 1963   2 Sheets-Sheet 1
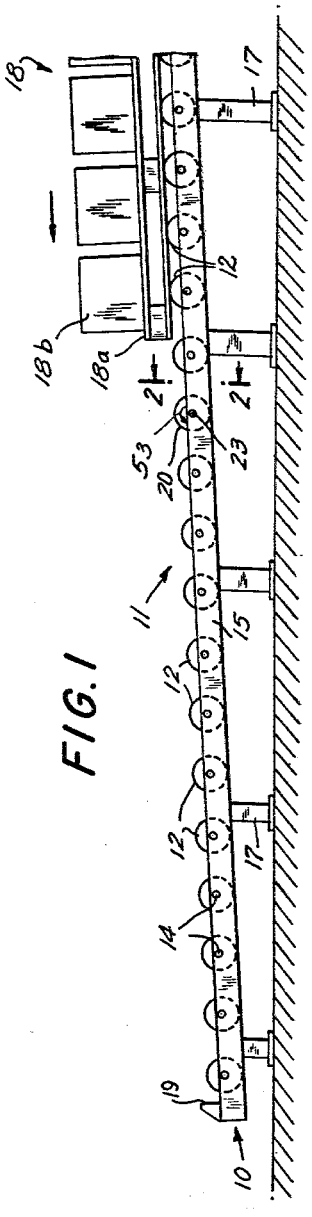
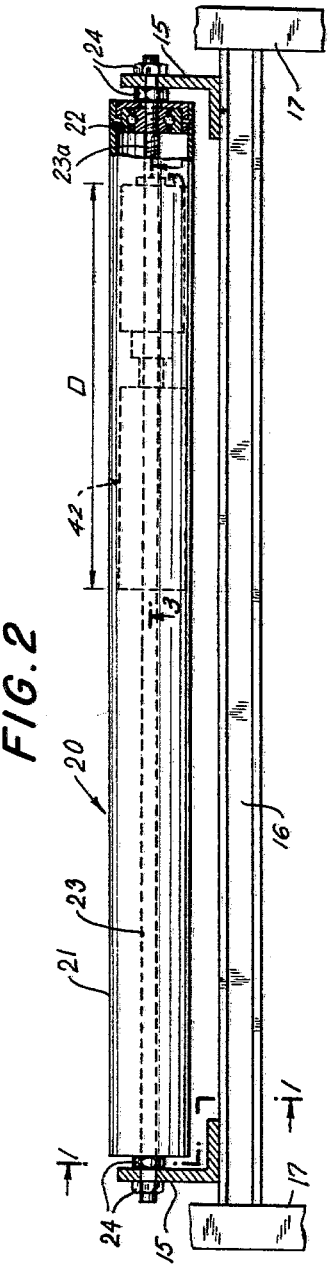
INVENTOR.
Sven-Eric Isacsson
BY
his ATTORNEY April 27, 1965 SVEN-ERIC ISACSSON 3,180,472
BRAKING ROLLER FOR CONVEYOR
Filed March 5, 1963 2 Sheets-Sheet 2
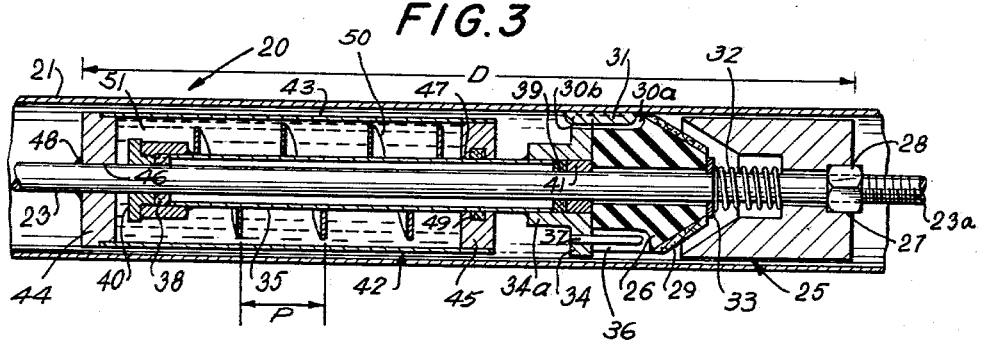
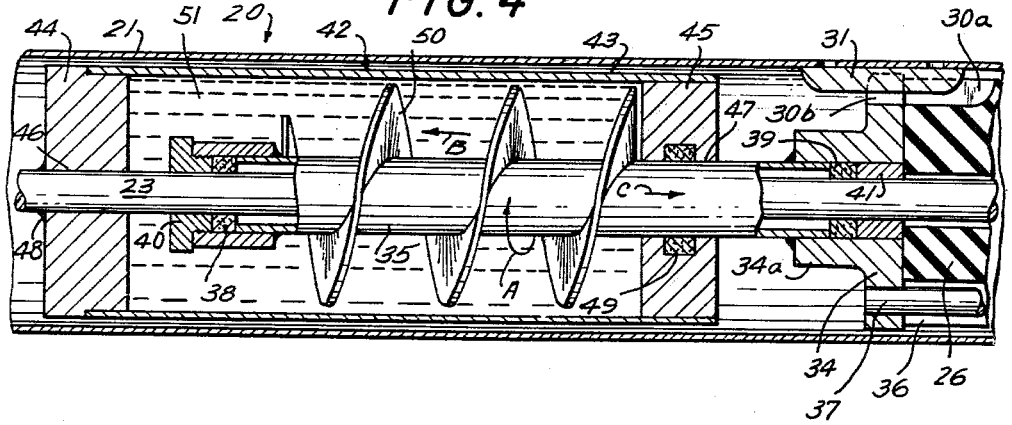
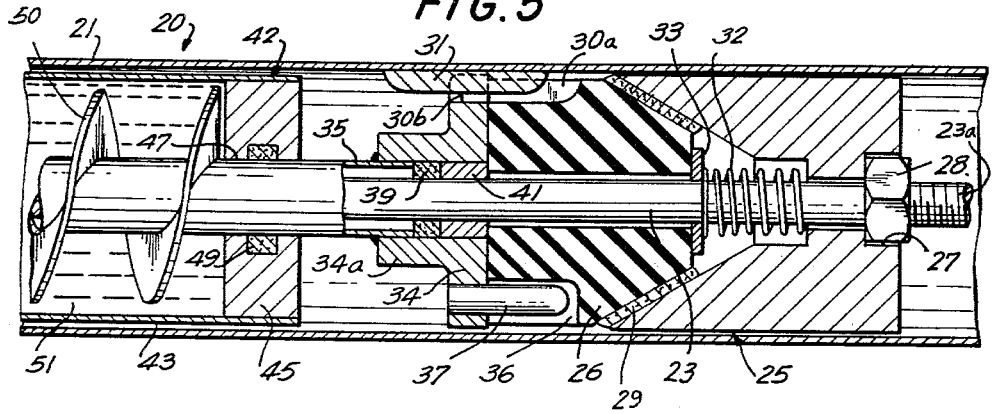
INVENTOR.
Sven-Eric Isacsson
BY
his ATTORNEY

3,180,472
BRAKING ROLLER FOR CONVEYOR
Sven-Eric Isacsson, Saffle, Sweden, assignor to Aktiebolaget Electrolux, Stockholm, Sweden, a corporation of Sweden
Filed Mar. 5, 1963, Ser. No. 262,973
Claims priority, application Sweden, Mar. 8, 1962, 2,599/62
14 Claims. (Cl. 193—37)

My invention relates to conveyors of the type having rollers along which articles travel by gravity, and more particularly to a conveyor having a roller for braking movement of the articles moving on it.

An object of my invention is to provide in a roller-type conveyor a roller and improved mechanism for braking the roller.

Another object of my invention is to provide an improved roller and brake constructed as a single unit in such manner that the parts of the brake and actuating mechanism therefor are accurately aligned and rigidly secured within the roller.

Further objects and advantages of my invention will become apparent as the following description proceeds, and the various features of novelty which characterize my invention are pointed out with particularity in the claims annexed to and forming a part of this specification.

For a better understanding of my invention, reference may be had to the following description taken in connection with the accompanying drawing, in which FIG. 1 is a longitudinal sectional view, taken on line 1—1 of FIG. 2, of a conveyor embodying my invention; FIG. 2 is an enlarged sectional view, partly broken away, taken on line 2—2 of FIG. 1; FIG. 3 is an enlarged fragmentary sectional view taken on line 3—3 of FIG. 1; and FIGS. 4 and 5 are enlarged fragmentary sectional views of parts shown in FIG. 3 to illustrate details more clearly.

Referring to the drawing, I have shown my invention in connection with a conveyor 10 comprising an inclined rollerway 11 having a plurality of parallel cylinders or rollers 12 journaled at their ends in any suitable manner (not shown) on shafts 14 which extend through the rollers and at their ends are fixed to side frames 15. The side frames 15 are supported by members 16 which extend transversely of the conveyor 10 and are fixed at their ends to upright supports 17. The conveyor 10 is adapted to receive articles 18 which move downward by gravity on the inclined rollerway 11, the lower end of which is provided with an elongated stop 19 which is in the path of movement of the articles and is secured at its ends to the side frames 15.

During their downward movement on the conveyor 10 the articles 18 frictionally engage and impart rotating movement to the rollers 12 which define a path of movement for the articles. At a part of the conveyor 10 between the stop 19 and the upper article receiving end thereof, I provide a braking roller 20 which functions to decrease the speed at which successive articles 18 move downward over the rollers 12. After being slowed down, each article will continue to move down the rollerway 11 by gravity toward the stop 19. The braking roller 20 comprises a hollow casing or tubular member 21 which is of cylindrical form and essentially like the tubular members of the conventional rollers 12. As shown in FIG. 2, the hollow casing 21 is rotatably supported at its ends at 22 to a shaft 23 which extends therethrough and is fixed at its ends by tightening nuts 24 to the side frames 15.

In accordance with my invention, the braking roller 20 is provided with braking mechanism which includes a fixed brake member 25 and a movable brake member 26 which is axially movable in engagement with the fixed brake member responsive to rotation of the roller 20. The brake member 25, which is disposed within the casing 21 and held on the shaft 23, may be formed of metal and is provided with a non-circular recess 27 which receives a similarly shaped nut 28 at the inner end of a threaded section 23a of the shaft 23 to lock the brake member 25 in a fixed position on the shaft. The brake members 25 and 26 constitute external and internal cone elements, respectively, of a friction brake. The movable brake member 26, which is apertured and axially movable on the shaft 23, is desirably formed of an elastomeric material, to which is fixed, as by a suitable adhesive, for example, a brake lining 29. By way of example, the elastomeric material may consist of any suitable resilient substance such as natural or synthetic rubber or other rubber-like plastics, and the brake lining may be formed of leather.

The brake member 26 is provided with an axially extending slot or keyway 30a at the outer peripheral surface thereof which receives an elongated lug or feather key 31 fixed to the inner surface of the casing 21. With a feather or spline connection of this type, the brake member 26 rotates on the shaft 23 when rotating movement is imparted to the casing 21, and it is also axially movable with respect to the casing by reason of the key and slot connection 30a, 31 therebetween. When movement is imparted to the axially movable internal cone element or brake member 26 to bring it into frictional engagement with the outer cone element or brake member 25, as will be described presently, such movement of the brake member 26 is effected against the compression developed by a coil spring 32 disposed about the shaft 23 between the brake members. A suitable protective bearing plate or washer 33 axially movable on the shaft 23 is interposed between the coil spring 32 and the small end of the inner cone element or brake member 26. When the brake is rendered inoperative and the axially movable brake member 26 is no longer maintained in frictional engagement with the brake member 25, the brake members 25 and 26 are separated from one another by the biasing action of the coil spring 32.

The mechanism for axially moving the inner cone element or brake member 26 into frictional engagement with the outer cone element or brake member 25 comprises a brake actuating plate 34 having a hub 34a secured to one end of a quill shaft 35 disposed about the shaft 23 and axially movable thereon. The plate 34, which functions as a back-up member for the brake member 26 and bears against the latter, is formed with an axially extending slot or keyway 30b at its periphery which is in alignment with the slot 30a in the brake member 26 and receives a part of the elongated lug or key 31. To prevent relative angular movement of the brake member 26 and the plate 34, the brake member is formed with an axially extending recess or groove 36 at its periphery which receives a pin 37 fixed to the plate 34.

The opposite ends of the quill shaft 35 are respectively provided with packing at 38 and 39 and bushings at 40 and 41 which serve as bearings for the quill shaft, the bushing 41 being retained within the hub 34a of the brake actuating plate 34. A part of the quill shaft 35 is disposed within a cylinder 42 comprising a hollow sleeve 43 and end walls 44 and 45 secured thereto. The outer diameter of the sleeve 43 approaches the inner diameter of the casing 21, as seen in FIGS. 4 and 5. The stationary shaft 23 extends through opening 46 and 47 in the end walls 44 and 45, respectively, and is secured at 48 to the end wall 44, as by welding, for example. The end wall 45 is provided with packing at 49 to proivide a fluid seal at the region the quill shaft 35 passes through the opening 47 in the end wall 45.

To the part of the quill shaft 35 within the cylinder 42 is secured a screw propeller 50 which comprises a continuous helical rib or vane that extends radially from the outer peripheral surface of the quill shaft to a region closely adjacent to the inner surface of the sleeve 43 to provide a thread of relatively great depth. The pitch of the helical rib or vane, which is indicated at P in FIG. 3, is sufficiently high to obtain the desired axial movement of the quill shaft 35 when rotating movement is imparted thereto, as will be described presently.

The screw propeller 50 is immersed in a body 51 of flowable material held in the cylinder 42 which may be provided with a suitable filling opening having a closure member (not shown). The flowable material 51, which may be a suitable oil or grease, for example, constitutes a resisting medium in which the screw propeller 50 functions to impart axial movement to the quill shaft 35 when it rotates. When the screw propeller 50 revolves in the direction of the arrow A in FIG. 4 and thrusts backward against the resisting medium 51 in the direction of the arrow B, a force is developed to move the quill shaft 35 forward in the direction of the arrow C.

When an article 18, such as a pallet 18a having a load 18b thereon, travels downward by gravity on the rollerway 11, the conventional rollers 12 revolve freely as the article passes over them in physical contact with their outer peripheral surfaces. When the article 18 reaches the braking roller 20 and comes in physical contact with the outer peripheral surface of the casing 21, the latter commences to rotate on the shaft 23 in the direction of the arrow A. Due to the feather connection provided by the key 31 at the inner surface of the casing 21 and the aligned keyways 30a and 30b on the brake member 26 and back-up plate 34, respectively, rotating movement in the direction of the arrow A will also be imparted to the brake member 26, plate 34 and quill shaft 35 when the casing 21 begins to rotate. Rotation of the quill shaft 35 renders the screw propeller operable to move the quill shaft and back-up plate 34 axially in the direction of the arrow C in the manner explained above. Under these conditions, the back-up plate 34 functions to move the brake member 26 axially from the position shown in FIG. 3 to the position shown in FIG. 5 into frictional engagement with the brake member 25 against the biasing action of the coil spring 32, the back-up plate 34 and brake member 26 being axially movable along the key or elongated lug 31 fixed to the casing 21. When the quill shaft 35 stops rotating due to the frictional engagement of the brake members 25 and 26, rotation of the casing 21 stops also. When this occurs the article 18 traveling on the rollerway 11 and in physical contact with the stationary casing 21 of the braking roller 20 is retarded by friction developed between the article and the surface of the casing 21, the kinetic energy of the moving article being expended against the resisting frictional force to slow down and possibly even arrest movement of the article momentarily.

When the braking roller 20 stops rotating responsive to the frictional engagement of the brake members 25 and 26, the back-up plate 34, quill shaft 35 and screw propeller 50 also stop rotating and the latter is rendered inoperable to impart axial movement to the quill shaft 35 in the direction of the arrow C. When this occurs the movable brake member 26 is separated from the stationary brake member 25 by the biasing action of the coil spring 32. Under these conditions, the coil spring 32 becomes effective to move the brake member 26, back-up plate 34, quill shaft 35 and screw propller 50 from their positions shown in FIGS. 4 and 5 to their positions shown in FIG. 3.

With the brake members 25 and 26 out of frictional engagement, the braking roller 20 is again free to rotate. This may occur after the article responsible for the braking action of the roller 20 has moved past the braking roller. If the braking roller 20 becomes free to rotate when the braking action has been effective to arrest the travel of an article on the rollerway 11, the article in physical contact with the braking roller can commence to move downward by gravity on the rollerway. If the article is sufficiently long, the brake members 25 and 26 may be rendered operable to stop the roller 20 before the article leaves it, because the brake operating mechanism begins to function the moment the roller 20 begins to revolve.

The braking effect of the braking roller 20 is dependent upon the speed at which an article 18 moves over it. The speed at which the quill shaft 35 and screw propeller 50 rotate is dependent upon the speed at which the casing 21 of the braking roller 20 rotates. Increase in the speed of rotation of the quill shaft 35 and screw propeller 50 increases the backward thrust against the resisting fluid medium 51 which in turn increases the pressure exerted against the movable brake member 26 by back-up plate 34, thereby increasing the resulting braking effect when the brake member 26 moves into frictional engagement with the brake member 25.

In view of the foregoing, it will now be understood that the shaft 23, brake member 25 and cylinder 42 form the stationary parts of the braking roller 20. Having the shaft 23 fixed or stationary facilitates accurate alignment of the parts of the brake and its actuating mechanism within the tubular casing 21. The threaded section 23a of the shaft 23 is so formed that the nut 28 in the recess 27 of the brake member 25 tends to move inward on the shaft to the extreme inner end of the threaded section 23a when the rotating brake member 26 moves axially into frictional engagement with the brake member 25, thus locking the latter in a stationary position on the shaft 23.

The construction of the conventional rollers 12 and the braking roller 20 may be the same. Therefore, each conventional roller 12 may include a hollow tubular member like the hollow tubular member 21 of the braking roller and all of the tubular members may be journaled on stationary shafts fixed to the side frames 15 in the same manner that the tubular member 21 is mounted for rotation on the rollerway 11, as illustrated in FIG. 2 and described above. With this construction of the braking roller, the parts of the brake and actuating mechanism therefor are readily assembled and aligned within the roller casing 21, and any conventional roller 12 can readily be altered or modified by incorporating in it braking mechanism of the kind described above and shown in FIGS. 3, 4 and 5. As seen in FIG. 3, the overall length of the brake and its actuating mechanism is D. As diagrammatically shown in FIG. 2, the brake and its actuating mechanism may be incorporated within the hollow tubular member 21 at one end of the braking roller 20. When the shaft 23 is disconnected from the side frames 15, the shaft can readily be removed from the tubular member 21 for inspection and repair of the braking mechanism if necessary. The braking roller 20 may be provided with suitable indicia, such as the arrow 53 in FIG. 1, for example, to indicate the direction in which the roller should rotate to render the braking mechanism operable to brake the roller.

It will be understood that several braking rollers 20 may be provided adjacent to one another on a rollerway. This may be desirable, for example, when the articles traveling on the rollerway have bottom surfaces that are uneven and certain portions of the surfaces do not come in physical contact with the rollers on the rollerway.

Although I have shown and described a single embodiment of my invention, I do not wish to be limited to the particular arrangement set forth, and I intend in the following claims to cover all modifications which do not depart from the spirit and scope of my invention.

I claim:

1. A braking roller for a conveyor or the like having a surface adapted to be contacted frictionally by moving articles to impart rotating movement thereto, said roller comprising; a casing of cylindrical form, a shaft, means for mounting said casing for rotation on said shaft, a brake for said roller having cooperating brake members mounted on said shaft, one of said brake members being fixed to said shaft and immovable thereon, the other of said brake members being rotatable on said shaft and axially movable thereon toward and from said one brake member, means comprising said casing when rotating movement is imparted thereto for driving said other brake member while the latter is in different axial positions on said shaft, resilient means comprising a spring which is mounted on said shaft between said brake members for resiliently biasing said members apart, and structure which coacts with said other brake member and is rendered operable by rotation of said casing when rotating movement is imparted thereto for developing force to cause said other brake member to move on said shaft toward said one brake member against the biasing action of said resilient means to brake said casing, said resilient means functioning to separate said brake members when rotation of said casing stops.

2. In a roller-type conveyor of the class described, the combination of a roller having a surface adapted to be contacted frictionally by moving articles to impart rotating movement thereto, means for journaling said roller for rotation about a stationary axis, a brake for said roller having cooperating brake members, one of said brake members being operatively associated with said roller and movable lengthwise of the axis in a path of movement toward and from the other of said brake members, and structure which coacts with said one brake member and is rendered operable by rotation of said roller for developing force to cause said one brake member to move in its path of movement toward said other brake member to brake said roller, said last-mentioned structure comprising a body of flowable material and mechanism which is rotatable about and axially movable along the axis and includes a rotatable part immersed in the body of material which functions as a resisting medium in which said rotatable part thrusts in one direction whereby said force is developed in the opposite direction to cause said movement of said one member, and means comprising said roller when rotating movement is imparted thereto for driving said mechanism and rendering said structure operable to effect braking of said roller.

3. The combination set forth in claim 2 in which said one brake member is rotatable about the axis, and means associated with said rotatable mechanism and said one brake member to prevent relative angular movement therebetween about the axis.

4. The combination set forth in claim 3 in which said driving means provides a positive drive connection between said roller and said one brake member which allows said one brake member to move lengthwise of the axis.

5. The combination set forth in claim 4 in which said driving means also provides a positive drive connection between said roller and said mechanism which allows said mechanism to move lengthwise of the axis.

6. In a roller-type conveyor of the class described, the combination of a roller having a surface adapted to be contacted frictionally by moving articles to impart rotating movement thereto, means for journaling the roller for rotation about a stationary axis, a brake for the roller having cooperating brake members, one of the brake members being operatively associated with the roller and movable toward and from the other brake member lengthwise of the axis, a vessel at the vicinity of and extending lengthwise of the axis, a body of flowable material in the vessel, mechanism which is rotatable about and axially movable along the axis and includes a rotatable screw propeller immersed in the body of flowable material for developing a force to move the one brake member toward the other brake member to effect braking of the roller, and means comprising the roller when rotating movement is imparted thereto for driving the mechanism and rendering the latter operable to effect braking of the roller.

7. In a roller-type conveyor of the class described, the combination of a roller having a surface adapted to be contacted frictionally by moving articles to impart rotating movement thereto, means for journaling said roller for rotation about a stationary axis, a brake having cooperating brake members, one of said brake members being rotatable about and axially movable along said axis toward and from the other of said brake members, means comprising said roller when rotating movement is imparted thereto for driving said one brake member about said axis, and structure which coacts with said one brake member and is rendered operable by rotation of said roller when rotating movement is imparted thereto for developing force to cause said one brake member to move along said axis toward said other brake member to brake said roller.

8. In a roller-type conveyor of the class described, the combination of a roller having a surface adapted to be contacted frictionally by moving articles to impart rotating movement thereto, means for journaling said roller for rotation about a stationary axis, a brake having cooperating brake members, one of said brake members being rotatable about and axially movable along said axis toward and from the other of said brake members, means connecting said roller and said one brake member whereby said roller, when rotating movement is imparted thereto, drives said one brake member in different axial positions thereof along said axis, structure which coacts with said one brake member and is rendered operable by rotation of said roller when rotating movement is imparted thereto to cause said one brake member to move along said axis toward said other brake member to brake said roller, and said roller comprising a hollow member within which said driving means and said structure and said brake members are disposed.

9. In a roller-type conveyor of the class described, the combination of a roller having a surface adapted to be contacted frictionally by moving articles to impart rotating movement thereto, means for journaling said roller for rotation about a stationary axis, a brake having cooperating brake members, one of said brake members being rotatable about and axially movable along said axis toward and from the other of said brake members, a brake actuating element rotatable about and axially movable along said axis, means connecting said roller to said one brake member and to said brake actuating element, respectively, whereby said roller drives said one brake member and said brake actuating element in different axial positions thereof along said axis, and structure comprising said brake actuating element which coacts with said one brake member and is rendered operable by rotation of said roller when rotating movement is imparted thereto for developing force to cause said one brake member to move along said axis toward said other brake member to brake said roller.

10. In a roller-type conveyor of the class described, the combination of a roller having a surface adapted to be contacted frictionally by moving articles to impart rotating movement thereto, means for journaling the roller for rotation about a stationary axis, a brake having cooperating brake members, one of the brake members being rotatable about and axially movable along the axis toward and from the other brake member, means comprising the roller when rotating movement is imparted thereto for driving the one brake member, and mechanism including a screw propeller and a body of resisting fluid in which the screw propeller is immersed for moving the one brake member toward the other brake member to brake the roller responsive to rotation of the roller.

11. A braking roller for a conveyor or the like having a shaft supported in a fixed position and a hollow tube rotatably supported on said shaft, said tube having a surface adapted to be contacted frictionally by moving articles to impart rotating movement thereto, a brake having cooperating brake members, one of said brake members being fixed to said shaft and the other of said brake members being rotatable about and axially movable on said shaft toward and from said one brake member, means connecting said tube and said movable brake member whereby, when rotating movement is imparted to said tube, said movable brake member is driven by said tube and axially movable with respect to said tube while being so driven, structure which coacts with said movable brake member and is rendered operable by rotation of said tube when rotating movement is imparted thereto to cause said movable brake member to move toward said fixed brake member to brake said tube, and said last-mentioned structure comprising mechanism rotatable about and axially movable along said shaft and means comprising said tube when rotating movement is imparted thereto for driving said mechanism and rendering said structure operable to effect braking of said tube, said tube enclosing said driving means and said structure and said brake members.

12. A braking roller as set forth in claim 11 in which the inner surface of said tube and outer surface of said movable brake member have cooperating parts providing a spline connection therebetween which constitutes said connecting means whereby said movable brake member is driven by and axially movable with respect to said tube.

13. A braking roller for a conveyor or the like having a shaft supported in a fixed position and a hollow tube rotatably supported on the shaft, the tube having a surface adapted to be contacted frictionally by moving articles to impart rotating movement thereto, a brake having cooperating brake members, one of the brake members being fixed to the shaft and the other brake member being rotatable about and axially movable on the shaft toward and from the one brake member, means connecting the tube and the movable brake member whereby, when rotating movement is imparted to the tube, the movable brake member is driven by the tube and axially movable with respect to the tube while being so driven, a vessel carried by said shaft and axially immovable thereon and a body of resisting fluid retained in the vessel, mechanism rotatable about and axially movable along the shaft for moving the movable brake member toward the fixed brake member to brake the tube, the mechanism including a screw propeller at one end thereof which is disposed within the vessel and immersed in the body of resisting fluid, and means connecting the opposite end of the mechanism and the movable brake member to prevent relative angular movement therebetween about the shaft, and means responsive to rotation of the tube for rendering the mechanism operable to brake the tube, the tube enclosing the last-mentioned means and mechanism and the brake members.

14. A braking roller as set forth in claim 13 in which the mechanism rotatable about the shaft comprises a quill shaft to the outer surface of one end of which the screw propeller is secured, and a brake actuating member fixed to the other end of the quill shaft at a region of the shaft adjacent to the movable brake member.

References Cited by the Examiner
UNITED STATES PATENTS

| | | | |
|---|---|---|---|
| 1,707,376 | 4/29 | Vogel | 198—127 |
| 2,806,558 | 9/57 | Schilling | 242—75.47 |
| 2,902,232 | 9/59 | Jacobsen | 242—75.47 |
| 2,921,788 | 1/60 | Lawrence | 193—40 |
| 3,033,350 | 5/62 | Stewart | 198—127 |

SAMUEL F. COLEMAN, *Acting Primary Examiner.*
ANDRES H. NIELSEN, *Examiner.*